US006689455B2

(12) United States Patent
Masaki

(10) Patent No.: US 6,689,455 B2
(45) Date of Patent: *Feb. 10, 2004

(54) METHOD OF PRODUCING HEXAGONAL FERRITE AND MAGNETIC RECORDING MEDIUM USING SAID HEXAGONAL FERRITE

(75) Inventor: Kouichi Masaki, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 0 days.

This patent is subject to a terminal disclaimer.

(21) Appl. No.: 10/107,478

(22) Filed: Mar. 28, 2002

(65) Prior Publication Data

US 2003/0049490 A1 Mar. 13, 2003

(30) Foreign Application Priority Data

Mar. 29, 2001 (JP) .................................. P.2001-096564

(51) Int. Cl.$^7$ ............................................... G11B 5/706
(52) U.S. Cl. ................ 428/329; 428/403; 428/694 BH; 252/62.56; 423/594
(58) Field of Search ................. 428/329, 403, 428/694 BH; 252/62.56, 62.62; 423/594

(56) References Cited

U.S. PATENT DOCUMENTS

| | | | | |
|---|---|---|---|---|
| 4,197,357 A | * | 4/1980 | Huisman | 428/692 |
| 4,407,721 A | * | 10/1983 | Koike et al. | 252/62.59 |
| 4,493,874 A | * | 1/1985 | Kubo et al. | 428/403 |
| 4,707,410 A | * | 11/1987 | Hata et al. | 428/413 |
| 4,719,121 A | * | 1/1988 | Kimball | 427/548 |
| 4,789,494 A | * | 12/1988 | Aoki et al. | 252/62.59 |
| 4,886,714 A | * | 12/1989 | Torii et al. | 428/694 BH |
| 5,686,714 A | * | 11/1997 | Abe et al. | 235/435 |
| 5,868,959 A | * | 2/1999 | Mayo et al. | 252/62.54 |
| 6,139,946 A | * | 10/2000 | Bailey et al. | 428/323 |

FOREIGN PATENT DOCUMENTS

| | | |
|---|---|---|
| JP | 2-138708 | 5/1990 |
| JP | 3-12441 | 2/1991 |
| JP | 2807278 | 7/1998 |

* cited by examiner

Primary Examiner—Stevan A. Resan
(74) Attorney, Agent, or Firm—Sughrue Mion, PLLC

(57) ABSTRACT

A method of producing hexagonal (system) ferrite, wherein the hexagonal (system) ferrite having an average tabular diameter of 10 to 40 nm and a coercive force (Hc) of 135 to 400 kA/m is treated with an organic compound containing a polar group having an acid dissociation constant (pKa) of 4 or below and/or a salt thereof when the ferrite is recovered and washed, and a magnetic recording medium comprising a support having thereon a non-magnetic layer comprising a non-magnetic powder and on the non-magnetic layer a magnetic layer comprising a ferromagnetic powder, wherein the ferromagnetic powder comprises a hexagonal (system) ferrite magnetic powder having an average tabular diameter of 10 to 40 nm and a coercive force (Hc) of 135 to 400 kA/m and being subjected to treatment with an organic compound containing a polar group having an acid dissociation constant (pKa) of 4 or below and/or a salt thereof.

7 Claims, No Drawings

METHOD OF PRODUCING HEXAGONAL FERRITE AND MAGNETIC RECORDING MEDIUM USING SAID HEXAGONAL FERRITE

FIELD OF THE INVENTION

The present invention relates to a method of producing hexagonal (system) ferrite and a magnetic recording medium, such as a magnetic tape, using the hexagonal (system) ferrite produced thereby. More specifically, the present invention relates to a method of producing a specific hexagonal (system) ferrite and a particulate-type magnetic recording medium which has a magnetic layer formed on a support by coating a magnetic coating composition containing a ferromagnetic powder and a binder as main components. In particular, the present invention relates to a magnetic recording medium containing a specific hexagonal (system) ferrite in a magnetic layer and enabling high-density recording, which is especially suitable for systems using a magnetoresistance-utilized MR head for reproduction.

BACKGROUND OF THE INVENTION

Hitherto, recording materials having on a support magnetic layers formed by application of binder-dispersed ferromagnetic iron oxide, cobalt-modified ferromagnetic iron oxide, $CrO_2$, ferromagnetic metal powder or hexagonal (system) ferrite have been widely used as magnetic recording media including video tapes, audio tapes, tapes for computer use and flexible disks. Of those magnetic powders, hexagonal (system) ferrite is known to have excellent high-density recording characteristics (by, e.g., Japanese Patent Application (Laid-Open) No. 157719/1985, Japanese Patent Application (Laid-Open) No. 109226/1987 and Japanese Patent Application (Laid-Open) 280215/1991).

In Japanese Patent Application (Laid-Open) 12650/1993 is disclosed a magnetic recording medium provided with a hexagonal (system) ferrite-containing magnetic layer, wherein the magnetic layer has a thickness adjusted to the range of 0.1 μm to 0.6 μm and a non-magnetic layer having a thickness greater than the thickness of the magnetic layer is formed between the magnetic layer and a support, thereby achieving improvements in surface properties, short wavelength output, erasure characteristics and durability. On the other hand, Japanese Patent Application (Laid-Open) 225547/1993 discloses a magnetic recording medium having on a support a non-magnetic layer and on the non-magnetic layer a magnetic layer containing magnetic powders having a particle size of 0.1 μm or below, thereby attaining not only excellent high-frequency characteristics but also a satisfactory signals-overwriting property and sufficient durability.

Further, Japanese Patent Application (Laid-Open) No. 290929/1994 describes as a hexagonal (system) ferrite having excellent magnetic characteristics and good dispersibility in a coating composition a hexagonal Ba ferrite having an Sm/Sc ratio of 1 or below wherein Sc represents a calculated specific surface area calculated from an average particle size determined by observation under a transmission electron microscope and Sm represents a specific surface area determined by the BET method.

Furthermore, *IEEE. Trans. Mag.*, vol. 23(6), p. 3125 (September 1987) reports a Ba ferrite of 0.70 to 0.82 in ratio of an actually measured specific surface area to a surface area calculated from an average diameter determined by observation under a transmission electron microscope.

In recent years, high-sensitive reproduction heads (MR heads) utilizing magnetoresistance effect have come to be used in the data recording systems for computers. Therein, noise originated from a magnetic recording medium occupies a dominant position in system noise. Okabe et al. suggests that the combined use of a barium ferrite-containing magnetic medium and an MR head is advantageous since it can avoid saturation of the MR head (*IEEE. Trans. Mag.*, volume 32(5), pages 3404–3406 (1996)).

With the intention of reducing the medium noise, it has been underway to make ferromagnetic particles finer. However, it is thought that an influence of thermal fluctuation on ferromagnetic particles is increased as the particles are made finer, and thereby a stability problem is caused in magnetization transition regions. The stability of magnetization is evaluated by $KuV/kT$ (wherein $Ku$ represents a magnetic anisotropic constant, $V$ represents a particle volume, $k$ represents Boltzmann constant and $T$ represents an absolute temperature).

In the case of hexagonal (system) ferrite, it is difficult to get a great $Ku$ value because the saturation magnetization thereof is about ⅓ to about ½ of the saturation magnetization of a ferromagnetic metal powder; as a result, the thermal fluctuation tends to become great. Further, there is an indication that the inter-particle interaction in a magnetic recording medium using hexagonal (system) ferrite is great and has an influence on a noise level of the medium. In addition, minute hexagonal (system) ferrite particles are single crystals and have a tabular shape. Therefore, once the so-called stacking is formed by mutual approach of particles, it becomes difficult to pull apart the particles. For this reason, a high-density recording medium produced by using a hexagonal (system) ferrite magnetic powder minute in particle size has a problem that, even in the case of reproduction with an MR head, the recording medium makes noises above the noise level expected from the volume and the number of particles therein and thereby it becomes difficult to secure sufficient C/N.

SUMMARY OF THE INVENTION

The present invention has been made in view of the problems concerning the related arts. Specifically, the first object of the present invention is to provide a method of producing fine particles of hexagonal (system) ferrite which are suitable for magnetic recording media, in which the particles are prevented from stacking and have good dispersibility. Further, our attention has been focused on the hexagonal (system) ferrite produced by such a specific method, and the second object of the present invention is to provide a magnetic recording medium which enables achievements of high short-wavelength output, high C/N and low medium noise even in the case of using an MR head for reproduction.

As a result of our intensive studies, it has been found that, when hexagonal (system) ferrite particle surfaces are treated with a polar group-containing organic compound and/or a salt thereof in a ferrite production process, the particles can have dispersiblity sufficiently enhanced to ensure high suitability for magnetic recording media. Moreover, it has been found that, by using the hexagonal (system) ferrite produced via the surface treatment as a magnetic powder incorporated in a magnetic layer, ultrashort-wavelength output necessary for high-density recording and media noise or noise level can be greatly improved, thereby achieving the present invention.

More specifically, the first invention relates to a method of producing hexagonal (system) ferrite, wherein when the hexagonal (system) ferrite having an average tabular diameter of 10 to 40 nm and a coercive force (Hc) of 135 to 400 kA/m is recovered and washed, the hexagonal (system) ferrite is treated with an organic compound containing a polar group having an acid dissociation constant (pKa) of 4 or below and/or a salt thereof.

The second invention relates to a magnetic recording medium having on a support a non-magnetic layer comprising a non-magnetic powder dispersed in a binder resin and on the non-magnetic layer a magnetic layer comprising a ferromagnetic powder dispersed in a binder resin, wherein the ferromagnetic powder comprises a hexagonal (system) ferrite magnetic powder that has an average tabular diameter of 10 to 40 nm and a coercive force (Hc) of 135 to 400 kA/m and is subjected to treatment with an organic compound containing a polar group having an acid dissociation constant (pKa) of 4 or below and/or a salt thereof.

In the present invention, it is preferred that the magnetic layer further contains a fatty acid, and besides, the suitable thickness thereof is from 0.01 to 0.5 μm and the product of a residual magnetic flux density and a magnetic layer thickness is appropriately from 0.5 to 100 mT·μm.

DETAILED DESCRIPTION OF THE INVENTION

Firstly, a method of producing hexagonal (system) ferrite, namely the first invention, is described in detail.

The present production method of hexagonal (system) ferrite is characterized in that, when hexagonal (system) ferrite having an average tabular diameter of 10 to 40 nm and a coercive force (Hc) of 135 to 400 kA/m is recovered and washed, surfaces of ferrite microcrystals just after formation are treated with an organic compound containing a polar group having an acid dissociation constant (pKa) of 4 or below and/or a salt thereof (sometimes abbreviated to "an organic compound" or "an organic matter" hereinafter), thereby causing adsorption of the organic compound to the ferrite surfaces.

Examples of hexagonal (system) ferrite produced by the method of the present invention include barium ferrite, strontium ferrite, lead ferrite and calcium ferrite, and substitutes of their ferrite. Specifically, magnetoplumbite-type barium or strontium ferrite, and further magnetoplumbite-type barium or strontium ferrite containing in part a spinel phase are usable in the present invention. These magnetic ferrite powders may contain various atoms other than the specified atoms, such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb and Pt. Examples of a combination of elements generally usable include Co—Ti, Co—Ti—Zr, Co—Nb, Co—Ti—Zn, Co—Zn—Nb, Ni—Ti—Zn, Nb—Zn, Ni—Ti, Zn—Ti and Zn—Ni. However, pure ferrite of magnetoplumbite type is preferable as compared with composite ferrite rich in spinel phase from the viewpoint of The hexagonal (system) ferrite produced by the method of the present invention is generally a powder having a hexagonal tabular shape, and the size thereof is measured as follows.

Sizes of hexagonal (system) ferrite and various other powders used in the present invention (which are referred to as powder sizes hereinafter) can be determined from high-resolution transmission electron photomicrographs of the powders. Specifically, the powder size is represented by a length of the major (long) axis of powder in a case (1) where the powder has an acicular, spindle or columnar shape (provided that the column height is greater than the greatest diameter of the column base), or by the greatest diameter of a tablet surface or a column base in a case (2) where the powder has a tabular or columnar shape (provided that the tablet thickness or the column height is smaller than the greatest diameter of the tablet surface or the column base, respectively), or by an equivalent circle diameter in a case (3) where the powder has a spherical shape, a polyhedral shape or an irregular shape in which its major axis is not determined. The term "equivalent circle diameter" is a diameter determined by a circle projection method.

An average size of the powder is an arithmetic mean of the powder size data determined by the method as described above. Herein, the size data of about 350 primary particles is averaged out. The term "primary particles" refers to the powder consisting of particles in a state of being mutually independent and not agglomerating. In other words, primary particles are individual particles constituting an agglomerated body.

An average acicular ratio of the powder refers to an arithmetic mean of the data on the major (i.e., long) axis length/minor (i.e., short) axis length ratio of the powder. The minor (i.e., short) axis length data used herein is obtained by minor (i.e., short) axis length measurements of about 350 primary particles. These measurements are made in accordance with the same method as described above. Herein, the term minor (i.e., short) axis length refers to the length of a short axis of a powder when the powder fits the case of powder size definition (1); while it refers to the thickness or the height of a powder when the powder fits the case of powder size definition (2). When a powder fits the case of powder size definition (3), however, there is no distinction between the major axis and the minor axis, so the long axis length/short axis length ratio is regarded as 1 for the convenience sake.

Further, when the powder has a specific shape, e.g., in the case of powder size definition (1), the average powder size refers to an average major (i.e., long) axis length; while, in the case of powder size definition (2), the average powder size refers to an average tabular diameter and the average tabular ratio refers to an arithmetic means of the greatest diameter/thickness or height ratio data. In the case of powder size definition (3), the average powder size refers to an average particle diameter. In the particle size measurements, the standard deviation/average value ratio expressed in percentage is defined as "variation coefficient".

The suitable average tabular diameter of hexagonal (system) ferrite produced by the production method of the present invention is from 10 to 40 nm, preferably from 15 to 35 nm. When the ferrite produced is too small in average tabular diameter, the specific surface area thereof becomes great, so that the ferrite is hard to disperse. When the ferrite produced is too great in average tabular diameter, on the other hand, the particle volume thereof becomes great to cause an increase in medium noise, so that a magnetic recording medium using such ferrite cannot have a high C/N ratio.

Further, the suitable average thickness of the hexagonal (system) ferrite is generally from 2 to 15 nm, particularly preferably from 4 to 10 nm. It is appropriate that variation coefficients of the average tabular diameter and the average thickness be small, preferably from 0 to 35%, particularly preferably from 0 to 30%.

And the suitable average tabular ratio is from 1.5 to 4, preferably from 2 to 3.8.

The coercive force (Hc) of hexagonal (system) ferrite produced by the method of the present invention is from 135 to 400 kA/m, preferably 140 to 350 kA/m, particularly preferably 150 to 330 kA/m. When the ferrite has a too small coercive force, it is hard to obtain short-wavelength output from the magnetic recording medium using such ferrite. On the other hand, when the ferrite incorporated in a magnetic recording medium has a too great coercive force, it becomes difficult to satisfactorily record signals on the recording medium with a recording head.

In addition, the suitable specific surface area of hexagonal (system) ferrite as measured by the BET method ($S_{BET}$) is generally from 30 to 150 m²/g, preferably from 40 to 120 m²/g. When the ferrite produced has a specific surface area smaller than 30 m²/g, the particle volume thereof is great and the noise level becomes high, and besides, the attractive forces- between particles becomes large to make it difficult to dissolve stacking, thereby accelerating the tendency to increase noise. On the other hand, when the specific surface area of ferrite produced is greater than 150 m²/g, the ferrite is hard to disperse and the resulting recording medium tends to have unsatisfactory surface properties.

Furthermore, the suitable water content in ferrite produced is from 0.3 to 2.0%. When the ferrite is used as a magnetic powder in a magnetic recording medium, it is appropriate that the water content in the magnetic powder be optimized depending on the kind of a binder used together with the magnetic powder.

In the method of the present invention, hexagonal (system) ferrite before treatment with a polar group-containing organic matter is not particularly restricted as to its preparation method, provided that the average tabular diameter and the coercive force thereof are controlled to the ranges described above. For instance, the ferrite can be prepared by a glass crystallization method, a coprecipitation flux method or a hydrothermal synthesis method. However, the glass crystallization method has an advantage of providing fine particles having a satisfactory size distribution.

The feature of the method of the present invention is that, at the recovery and wash stage in the process of producing hexagonal (system) ferrite, surfaces of the ferrite microcrystals just after formation are treated with an organic compound containing a polar group having an acid dissociation constant (pKa) of 4 or below and/or a salt thereof, thereby causing adsorption of the organic compound to the surfaces. In the present invention, this procedure is expressed as "treatment with the organic matter". By this procedure, hexagonal (system) ferrite microcrystals are prevented from stacking on one another (aggregation) and dispersibility thereof is improved. This effect is thought to be ascribable to the organic matter adsorbed to ferrite microcrystals just after precipitation of the microcrystals at the recovery and wash stage. The organic compound used in the method of the present invention may be any of organic compounds having low molecular weights (but not high molecular weights) as far as they contain polar groups having pKa values of 4 or below, but organic compounds whose polar groups are $PO(OH)_2$, $OPO(OH)_2$, $SO_3H$ and $SO_2H$ groups respectively are preferred in particular.

Examples of organic compounds containing those polar groups include methylenephosphonic acids, such as aminomethylphosphonic acid, aminoethylphosphonic acid, phenylphosphonic acid (1.8), aminotrimethylenephosphonic acid, ethylenediaminetetramethylenephosphonic acid, hexamethylenediaminetetramethylenephosphonic acid, diethylenetriaminopentamethylenephosphonic acid, triethylenetetraaminohexamethylenephosphonic acid, tetraethylenepentaaminoheptamethylenephosphonic acid and pentaethylenehexaaminooctamethylenephosphonic acid; alkylenediphosphonic acids, such as methylenediphosphonic acid, ethylene-1,1'-diphosphonic acid, ethylene-1,2'-diphosphonic acid, propylene-1,1'-diphosphonic acid, propylene-1,3'-diphosphonic acid, hexamethylene-1,6-diphosphonic acid, 2,4-dihydroxypentamethylene-2,4-diphosphonic acid, 2,5-dihydroxyhexamethylene-2,5-diphosphonic acid, 2,3-dihydroxybutylene-2,3-diphosphonic acid, 1-hydroxybenzyl-1,1'-diphosphonic acid and 1-aminoethylene-1,1'-diphosphonic acid; hydroxyalkylene-1,1'-diphosphonic acids, such as hydroxymethylenediphosphonic acid, 1-hydroxyethylene-1,1'-diphosphonic acid, 1-hydroxypropylene- 1,1'-diphosphonic acid, 1-hydroxybutylene-1,1'-diphosphonic acid and 1-hydroxyhexamethylene-1,1'-diphosphonic acid; other organic phosphonic acids, such as phenoxyphosphonic acid (1.95); arylsulfonic acids, such as benzenesulfonic acid (2.55), p-toluenesulfonic acid, 4-hydroxyphenylsulfonic acid, hydroquinonesulfonic acid, benzene-2,5-disulfonic acid and 4-butylbiphenyl-3'-sulfonic acid; sulfaminic acids, such as sulfaminic acid (1.65) and phenylsulfaminic acid; alkylsulfonic acids, such as methanesulfonic acid and sulfosuccinic acid; sulfinic acids, such as benzenesulfinic acid and methylsulfinic acid; dicarboxylic acids, such as phthalic acid ($pKa_1=2.75$), terephthalic acid ($pKa_1=3.54$), maleic acid ($pKa_1=1.75$) and malonic acid ($pKa_1=2.65$); and other acids, such as benzoylhydroxylamine, phenylsulfohydroxylamine and benzohydroxamic acid (2.3). Of these acids, ethylene-diaminetetramethylenephosphonic acid, diethylenetriamino-pentamethylenephosphonic acid and benzenephosphonic acid are preferred over the others.

The numerical values in parentheses attached to the compounds described above represent values of pKa. While all the organic compounds described above are acids, alkali metal (e.g., Na, K) salts or ammonium salts (including alkyl-substituted ammonium salts) thereof may be used alternatively, or both acids and their salts may be used together.

Additionally, the organic matter used may be a single compound (or salt) or a mixture of different organic compounds (or salts). When the organic compounds in acid and salt forms are used as a mixture, they may be similar or different in kind.

The acid dissociation constant (pKa) of an organic matter usable in the method of the present invention is 4 or below, preferably 3.8 or below. When the organic matter used has pKa greater than 4, a reduction in dispersibility-increasing effect is brought about.

In carrying out the treatment of the present invention with a specific organic matter and/or a salt thereof, a solution of the organic matter and/or its salt may be mixed with hexagonal (system) ferrite, or the organic matter and/or its salt may be added to and mixed in hexagonal (system) ferrite dispersed in a solvent in advance. And well-known treatment agent, such as acetic acid, may be present in the solution used for the treatment of the present invention, or the treatment of the present invention may be performed separately from treatment with acetic acid.

Examples of a solvent for the solution used in the treatment of the present invention include ion exchange water, an aqueous solution of acetic acid, easy water-soluble solvents such as methanol and ethanol, and various mixtures of these solvents.

The specific organic compounds and/or salts thereof are used in such an amount as to have an appreciable effect on dissolution of stacking (aggregation) of hexagonal (system) ferrite particles at the time of dispersion thereof and, in other words, to cover individual surfaces of hexagonal (system) ferrite particles at least in part, preferably in their substantial entirety. The hexagonal (system) ferrite produced in accordance with the method of the present invention may be subjected to surface treatment with Al, Si, P, Zr or Mg, or oxide or hydroxide of such an element, if desired. In the surface treatment, it is preferable to use $Al_2O_3 \cdot nH_2O$ or $SiO_2 \cdot nH_2O$. And it is desirable to adjust a substance used for the surface treatment in amount and proportion depending on the binder used. Specifically, the proportion of a substance used for the surface treatment to the hexagonal (system) ferrite is from 0.1 to 10% by weight (i.e., by mass). Such surface treatment has an advantage in that adsorption of a lubricant, such as a fatty acid, can be controlled to 100 mg/m² or below.

The hexagonal (system) ferrite produced using the method of the present invention may further be treated with a coupling agent. In addition, it is also appropriate that the hexagonal (system) ferrite of the present invention subjected to the carbon deposition treatment as disclosed in Japanese Patent Application (Laid-Open) No. 138115/2000 and Japanese Patent Application (Laid-Open) No. 200714/2000.

There are cases where the hexagonal (system) ferrite produced using the method of the present invention contains soluble salt-originated inorganic ions, such as Na, Ca, Fe, Ni, Sr or Ba ions. However, the result obtained becomes better the lower the inorganic ions are in total content, and those ions have negligible influence upon characteristics of the hexagonal (system) ferrite so far as the total content thereof is 100 ppm or below. The saturation magnetization ($\sigma s$) of the hexagonal (system) ferrite is at least 35 A·m$^2$/kg, preferably at least 40 A·m$^2$/kg, and the suitable tap density of the hexagonal (system) ferrite is at least 0.5 g/ml, preferably at least 0.8 g/ml.

In the present invention, the hexagonal (system) ferrite is treated with an organic matter containing a polar group having a pK of 4 or below and/or a salt thereof when it is recovered and washed, and thereby the organic matter and/or the salt thereof is adsorbed to the hexagonal (system) ferrite surface just after precipitation from a solid phase. Therefore, it is thought that, even when hexagonal (system) ferrite particles are stacked on one each other by magnetic force, they can be dispersed easily by a small force because of the presence of the organic matter on the particle surface.

Therefore, it is supposed that, when these hexagonal (system) ferrite particles are used for preparation of a magnetic recording medium, stacking of particles can be dissolved by a force applied at the dispersion step in the preparation process; as a result, noise can be reduced even in the case of reproduction with an MR head.

Secondly, a magnetic recording medium using as a magnetic powder the hexagonal (system) ferrite produced by the method of the present invention, namely the second invention, is described in detail.

The magnetic recording medium of the present invention has basically a support, a non-magnetic layer and a magnetic layer. The magnetic layer (upper layer) constituting the magnetic recording medium contains a magnetic powder and a binder resin as main components.

The magnetic powder used in the present invention is characterized by being hexagonal (system) ferrite which has an average tabular diameter of 10 to 40 nm and a coercive force (Hc) of 135 to 400 kA/m, and besides, which is subjected to the surface treatment with an organic compound containing a polar group having an acid dissociation constant (pKa) of 4 or below in and/or a salt thereof.

Additionally, other magnetic powders may be mixed with the hexagonal (system) ferrite magnetic powder of the present invention produced by the specific method in an amount of not impairing effects of the present invention. In this case, it is appropriate that the proportion of other magnetic powders to the total magnetic powders be 20% or below.

The magnetic layer to constitute the magnetic recording medium of the present invention contains a binder resin in addition to the magnetic powder as described above. Examples of a binder resin usable therein include known thermoplastic resins, thermosetting resins, reactive resins and various mixtures thereof.

In the case of thermoplastic resins, it is appropriate that their glass transition temperatures be from −100 to 150° C., their number average molecular weights be from 1,000 to 200,000, preferably from 10,000 to 100,000, and their polymerization degrees be from about 50 to about 1,000.

Suitable examples of a thermoplastic resin include homo- or copolymers containing as constitutional units, vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal or/and vinyl ether, polyurethane resin and various rubber resins.

Suitable examples of a thermosetting resin or a reactive resin include phenol resin, epoxy resin, polyurethane curing resin, urea resin, melamine resin, alkyd resin, acrylic reactive resin, formaldehyde resin, silicone resin, epoxy-polyamide resin, a mixture of polyester resin and isocyanate prepolymer, a mixture of polyester polyol and polyisocyanate, and a mixture of polyurethane and polyisocyanate.

If required for producing more excellent effect on dispersion of ferromagnetic powder and giving higher durability to the magnetic layer, at least one polar group selected from COOM, SO$_3$M, OSO$_3$M, P=O(OM)$_2$, O—P=O(OM)$_2$ (wherein M is a hydrogen atom or an alkali metal base), OH, NR$_2$, N$^+$R$_3$ (wherein R is an alkyl group, an alkenyl group, an acyl group or an aryl group), an epoxy group, SH or CN may be introduced into the binder resins as described above by copolymerization or addition reaction. The suitable content of those polar groups in a binder resin is from 10$^{-1}$ to 10$^{-8}$ mol/g, preferably from 10$^{-2}$ to 10$^{-6}$ mol/g.

In the magnetic layer of the magnetic recording medium of the present invention, the binder resin is used in a proportion of 5 to 50 weight %, preferably 10 to 30 weight %, based on the ferromagnetic powder. In the case of use of a vinyl chloride resin, 5 to 100 weight % of vinyl chloride resin is used, and in the case of use of polyurethane resin, 2 to 50 weight % of polyurethane resin and 2 to 100 weight % of polyisocyanate are used.

Examples of vinyl chloride resin include copolymer of vinyl chlorine and vinyl acetate, copolymer of vinyl chloride and (meth)acrylate, copolymer of vinyl chloride, vinyl acetate and vinyl alcohol, maleic acid and/or acrylic acid, copolymer of vinyl chloride and vinyl propionate, copolymer of vinyl chloride and vinylidene chloride, and copolymer of vinyl chloride and acrylonitrile.

Examples of polyurethane resin include polyester polyurethane, polyether polyurethane, polyether polyester polyurethane, polycarbonate polyurethane, polyester polycarbonate polyurethane, and polycaprolactone polyurethane.

When polyurethane is used as a binder resin in the magnetic layer to constitute the magnetic recording medium of the present invention, it is appropriate for the polyurethane to have a glass transition temperature of −50° C. to 100° C., an elongation at break of 100% to 2,000%, a breaking stress of 0.05 Kg/mm$^2$ to 10 Kg/mm$^2$ (0.49 MPa to 98 MPa) and a yield point of 0.05 Kg/mm$^2$ to 10 Kg/mm$^2$ (0.49 MPa to 98 MPa).

Examples of polyisocyanate usable herein include isocyanates, such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate and triphenylmethane triisocyanate; reaction products of these isocyanates and polyalcohols; and polyisocyanates as condensation products of isocyanates.

Commercially available products of the isocyanates as described above are, e.g., Coronate L, Coronate HL, Coronate 2030, Coronate 2031, Millionate MR and Millionate MTL (trade names, produced by Nippon Polyurethane Co., Ltd.), TakenateD-102, Takenate D-110N, Takenate D-200 and Takenate D-202 (trade names, produced by Takeda Chemical Industries, Ltd.), and Desmodur L, Desmodur IL, Desmodur N and Desmodur HL (trade names, produced by Sumitomo Bayer Co., Ltd.). These products may be used alone or as a combination made of at least two products utilizing a difference in curing reactivity.

Besides containing the magnetic powder and the binder resin as described above, the magnetic layer of the magnetic recording medium of the present invention can generally contain ingredients having various functions, such as a lubricant, an abrasive, a dispersing agent, an antistatic agent, a plasticizer and an antimold, depending on the desired purpose.

Examples of a lubricant usable in the magnetic layer of the present invention include silicone oils, such as dialkylpolysiloxanes (wherein each alkyl group contains 1 to 5 carbon atoms), dialkoxypolysiloxanes (wherein each alkoxy group contains 1 to 4 carbon atoms), monoalkyl-monoalkoxypolysiloxanes (wherein each alkyl group contains 1 to 5 carbon atoms and each alkoxy group contains 1 to 4 carbon atoms), phenylpolysiloxanes and fluoroalkylpolysiloxanes (wherein each alkyl group contains 1 to 5 carbon atoms); electro-conductive fine powders, such as graphite; inorganic powders, such as molybdenum disulfide and tungsten disulfide; fine powders of plastics, such as polyethylene, polypropylene, vinyl chloride copolymer and poly (tetrafluoroethylene); α-olefin polymers; saturated fatty acids in a solid state at room temperature (containing 10 to 22 carbon atoms); unsaturated aliphatic hydrocarbons in a liquid state at room temperature (compounds having terminal carbons to which n-olefin double bonds are attached and containing about 20 carbon atoms); fatty acid esters produced from monobasic fatty acids having 12 to 20 carbon atoms and monohydric alcohol compounds having 3 to 12 carbon atoms; and fluorocarbons.

Of those lubricants, saturated fatty acids and fatty acid esters are preferred. In particular, it is advantageous to use them in combination. Examples of alcohol as a starting material of fatty acid ester include monohydric alcohol, such as ethanol, butanol, phenol, benzyl alcohol, 2-methylbutyl alcohol, 2-hexyldecylalcohol, propyleneglycolmonobutylether,ethylene glycol monobutyl ether, dipropylene glycol monobutyl ether, diethylene glycol monobutyl ether or s-butyl alcohol; and polyhydric alcohol, such as ethylene glycol, diethylene glycol, neopentyl glycol, glycerin or sorbitan derivatives. Examples of fatty acid as the other starting material include aliphatic carboxylic acids, such as acetic acid, propionic acid, octanoic acid, 2-ethylhexanolic acid, lauric acid, myristic acid, stearic acid, palmitic acid, behenic acid, arachic acid, oleic acid, linolic acid, linolenic acid, elaidic acid and palmitoleic acid, and mixtures of these acids.

Examples of fatty acid esters prepared from those starting materials, include various ester compounds, such as butyl stearate, s-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, butoxyethyl stearate, 2-butoxy-1-propyl stearate, a product obtained by acylating dipropylene glycol monobutyl ether with stearic acid, diethylene glycol dipalmitate, hexamethylenediol acylated with myristic acid, and glycerin oleate.

For reducing hydrolysis of fatty acid esters, which often occur when the magnetic recording media are used under high-humidity conditions, it is appropriate that fatty acids and alcohol compounds as starting materials be selected properly with respect to their structural isomers, e.g., from branched or linear isomers, or from cis or trans isomers, and with respect to their branched positions.

These lubricants are added in a proportion of 0.2 to 20 parts by weight to 100 parts by weight (i.e., by mass) of binder resin.

Further, the compounds described below are also usable as lubricants. Specifically, silicone oil, graphite, molybdenum disulfide, boron nitride, graphite fluoride, fluorinated alcohol, polyolefin, polyglycol, alkyl phosphate and tungsten disulfide are included in such lubricants.

Abrasives usable in the magnetic layer of the present invention are generally used materials, with examples including α-alumina, γ-alumina, molten alumina, corundum, artificial corundum, silicon carbide, chromium oxide ($Cr_2O_3$), diamond, artificial diamond, garnet, emery (main components: corundum and magnetite), and α-$Fe_2O_3$. Of these abrasives, the materials having Mohs' hardness of at least 6 are preferred. Examples of commercially available abrasives include AKP-10, AKP-15, AKP-20, AKP-30, AKP-50, AKP-1520, AKP-1500, HIT-50, HIT60A, HIT60G, HIT70, HIT80, HIT82 and HIT-100 which are products of Sumitomo Chemical Co., Ltd.; G5, G7, S-1 and chromium oxide K which are products of Nippon Chemical Industrial Co., Ltd.; UB40B which is a product of Uemura Kogyo & Co.,Ltd.; WA8000 and WA10000 which are products of Fujimi Abrasives Corporation; LS600F 0/-1/4 which is a product of LANDS Co., Ltd.; MD-200, MD-150, MD-100, MD-70, IRM 0-1/4F and IRM 0-1/4FF which are products of Tomei Diamond Co., Ltd.; 0-1/10 and 0-1/4 which are products of GE; Mypolex 1/10QG and 1/8QG which are products of Du Pont; and TF100, TF140 and TF180 which are products of Toda Kogyo Corp. The abrasives measuring from 0.05 to 1 μm in average particle size are effective. Preferably, their average particle sizes are from 0.05 to 0.5 μm Not only independent use but also combined use of abrasives is suitable. For instance, the combined use of fine-grained diamond and another abrasive makes it possible to reduce a proportion of the diamond added to the magnetic powder to about 0.1%. The total amount of abrasives added is from 1 to 20 parts by weight, preferably from 1 to 15 parts by weight, per 100 parts by weight of magnetic powder. When the abrasives are added in a total amount smaller than 1 parts by weight, sufficient durability cannot be achieved. When the total amount is greater than 20 parts by weight, on the other hand, deterioration in surface properties and filling degree tends to occur. These abrasives may be added to a magnetic coating composition after they are dispersed in a binder resin.

The magnetic layer of the magnetic recording medium of the present invention can also contain electrically conductive particles as an antistatic agent. In particular, addition of carbon black as the antistatic agent is advantageous because it can lower surface electric resistance of the medium as a whole. Examples of carbon black usable in the present invention, include furnace black for rubber, thermal black for rubber, carbon black for color, electrically conductive carbon black and acetylene black. The suitable carbon black has its specific surface area in the range of 5 to 500 $m^2/g$, and its DBP absorptive capacity in the range of 10 to 1500 ml/100 g, its particle size in the range of 5 to 300 nm. Further, it is appropriate that the pH, water content and tap density of the carbon black used be from 2 to 10, from 0.1 to 10% and from 0.1 to 1 $g/cm^3$, respectively.

Examples of commercial carbon black which can be used in the present invention include BLACKPEARLS 2000, 1300, 1000, 900, 800 and 700, and VULCAN XC-72 which are products of Cabot Co.; #80, #60, #55, #50 and #35 which are products of Asahi Carbon Co , Ltd.; #3030B, #3040B, #3050B, #3230B, #3350B, #9180B, #2700, #2650, #2600, #2400B, #2300, #950, #900, #1000, #95, #30, #40, #10B, MA230, MA220 and MA77 which are products of Mitsubishi Chemical Ltd.; CONDUCTEX SC, RAVEN 150, 50, 40 and 15 which are products of Colombia Carbon Co.; and KETJENBLALCK EC, KETJENBLALCK ECDJ-500 and KETJENBLALCK ECDJ-600 which are products of Lion Akuzo Co. In advance of its use, carbon black may be surface-treated with a dispersing agent or subjected to oxidation treatment, a resin may be grafted onto carbon black, or carbon black surface may be partly converted into graphite. On the other hand, carbon black may be dispersed into a binder before it is added to a magnetic coating composition. When the carbon black is used in the magnetic layer, it is appropriate to use it in a proportion of 0.1 to 30 weight % based on the magnetic powder. Further, it is suitable to incorporate the carbon black in a nonmagnetic layer described hereinafter in a proportion of 3 to 20 weight % based on the total nonmagnetic powders.

In general carbon black functions not only as an antistatic agent but also as a friction coefficient reducer, a light shield or a film strength improver. The functions vary with carbon black products. Therefore, in consideration of kind, amount, combination and various properties including particle size, oil absorption, electric conductivity and pH, the carbon black used in the present invention can be selected from those carbon black products so as to suite the desired purpose. Details of carbon black usable in the present invention can refer to, e.g., Carbon Black Binran (which may be translated by the English title "Handbook of Carbon Black"), compiled by Carbon Black Association.

The magnetic recording medium of the present invention which has the magnetic layer containing the hexagonal (system) ferrite magnetic powder produced by the method of the present invention can have any of well-known layer structures as far as a non-magnetic layer is provided between the magnetic layer and a support.

Next the non-magnetic layer which constitutes the magnetic recording medium of the present invention is described below.

The non-magnetic layer (lower layer) contains a non-magnetic powder in a state of dispersion in a binder resin. As the non-magnetic powder, various kinds of powders can be used. Examples of such powders include aluminum oxide having an β-alumina content of at least 90%, β-alumina, γ-alumina, silicon carbide, chromium oxide, cerium oxide, α-iron oxide, goethite, corundum, silicon nitride, titanium carbide, titanium dioxide, silicon dioxide, boron nitride, zinc oxide, calcium carbonate, calcium sulfate and barium sulfate. These powders may be used alone or as various combinations thereof. Of the powders described above, α-iron oxide, goethite, titanium dioxide and zinc oxide are preferred, because they are fine particles having a narrow size distribution. It is appropriate that those non-magnetic powders have their particle sizes in the range of 0.01 to 1 $\mu$m. However, if desired, the average particle size may fall within such a range by the combined use of non-magnetic powders differing in particle size or by independent use of a non-magnetic powder having a broad particle size distribution. For strengthening interaction with a binder resin used together and improving dispersibility, the non-magnetic powder may be subjected to surface treatment before use. Examples of a substance which may be present on the particle surface by the surface treatment include an inorganic substance, such as silica, alumina or silica-alumina, and a reaction product with a coupling agent. The non-magnetic powder suitably used in the present invention has a tap density of 0.3 to 2 g/cm$^3$, a water content of 0.1 to 5 weight %, a pH value of 2 to 11, and a specific surface area of 5 to 100 m$^2$/g. The shape of the non-magnetic powder may be any of acicular, spherical, cubic (i.e., die-shaped) and tabular shapes.

Examples of such a non-magnetic powder include Nanotite produced by Showa Denko K. K., HIT-100 and HIT-80 produced by Sumitomo Chemical Co., Ltd., DPN-250BX, DPN-245, DPN-270BX, DPN-550RX, DBN-450BX, DBN-650RX and DAN-850RX which are α-iron oxide products of Toda Kogyo Corp., TTO-51B, TTO-55A, TTO-55B, TTO-55C, TTO-55S, TTO-55D and SN-100 which are titanium dioxide products of Ishihara Sangyo, STT-4D, STT-30D, STT-30 and STT-65C which are titanium dioxide products of Titan Kogyo, MT-100S, MT-100T, MT-150W, MT-500B, MT-600B, MT-100F and MT-500HD which are titanium dioxide products of TAYCA Corporation, FINEX-25, BF-1, BF-10, BF-20 and ST-M produced by Sakai Chemical Industry Co., Ltd., DEFIC-Y and DEFIC-R which are iron oxide products of Dowa Mining Co., Ltd., AS2BM and TiO$_2$ P25 produced by Nippon Aerosil Corporated, and 100A, 500A and burned substances thereof produced by Ube Industries Ltd.

As a binder resin contained in the non-magnetic layer constituting the magnetic recording medium of the present invention, various resins described as binder resins usable in the magnetic layer can be used. In addition to the non-magnetic powder and the binder resin, various additives including an abrasive, a lubricant and an antistatic agent can be added to the non-magnetic layer. Examples of compounds usable as these additives include the same ones as described as the additives usable in the magnetic layer.

A support used in the magnetic recording medium of the present invention generally has a thickness of 3 to 100 $\mu$m. Preferably, the thickness is from 3 to 20 $\mu$m when the medium is used in the form of tape, while it is from 25 to 80 $\mu$m when the medium is used as flexible disk. The thickness of the non-magnetic layer provided on a support is generally from 0.5 to 5.0 $\mu$m, preferably from 0.5 to 3 $\mu$m. The thickness of the magnetic layer is preferably from 0.01 to 0.5 $\mu$m, particularly preferably from 0.05 to 0.3 $\mu$m. Layers other than the magnetic layer and the non-magnetic layer can further be formed depending on the intended purposes. For instance, a subbing layer (i.e., an undercoating layer) for enhancing adherence may be provided between the support and the lower layer. The thickness of the subbing layer is generally from 0.01 to 1 $\mu$m, preferably from 0.05 to 0.3 $\mu$m. In addition, the support may be provided with a backing layer on the side opposite to the magnetic layer. The thickness of the backing layer is generally from 0.1 to 1.0 $\mu$m, preferably from 0.3 to 1.0 $\mu$m. These subbing and backing layers may be any of known ones respectively. When the magnetic recording medium has a disk shape, the magnetic layer can be provided on one side or both sides of the support.

For prevention of deterioration caused in reproduction output by saturation of an MR head, it is preferable that the product of residual magnetic flux density (Br) and magnetic layer thickness ($\delta$) be from 0.5 to 100 mT·$\mu$m (particularly from 1.0 to 80 mT·$\mu$m). The product greater than 100 mT·$\mu$m is undesirable because MR head saturation tends to be caused.

The support used in the present invention has no particular restrictions, but may be any of generally used support materials. Examples of a support material usable herein include films of various synthesis resins, such as polyethylene terephthalate, polyethylene, polypropylene, polycarbonate, polyethylene naphthalate, polyamide, polyamideimide, polyimide, polysulfone and polyether sulfone, and metallic foils, such as aluminum foil and stainless foil.

For effectively achieving the present objects, it is preferable that the surface roughness of the support be 0.03 $\mu$m or below, preferably 0.02 $\mu$m or below, and particularly preferably 0.01 $\mu$m or below, in terms of center-line average surface roughness [defined in JIS B 0601] (cut-off value: 0.25 mm). Besides being small in center-line average surface roughness, it is advantageous that the support of the present invention is free of coarse projections measuring 1 $\mu$m or above in height. The surface roughness dimensions can be adjusted freely by selecting sizes and amounts of fillers added to the support as needed. Examples of such fillers include inorganic fine powders of oxides or carbonates of Ca, Al, Si and Ti, and organic fine powders of acrylic resins. The suitable F-5 values of a support used in the present invention are from 5 to 50 kg/mm² (49 to 490 MPa) in the web-running direction (i.e., the machine direction) and from 3 to 30 kg/mm² (29.4 to 294 MPa) in the direction of web width (i.e., the transverse direction). The F-5 value is generally higher in the web length direction (i.e., the machine direction) than in the web width direction (i.e., the transverse direction), but this relation needs not apply in cases where the necessity of heightening the strength in the width direction arises.

The suitable thermal shrinkage ratio of the support in both web-running and width directions is not more than 3%, preferably not more than 1.5%, under heating at 100° C. for 30 minutes, and not more than 1%, preferably not more than 0.5%, under heating at 80° C. for 30 minutes. In addition, it is advantageous that the support has its breaking strength of 5 to 100 kg/mm² (49 to 980 MPa) in both directions and its elasticity modulus of 100 to 2,000 kg/mm² (980 to 1960 MPa).

In the magnetic layer and the non-magnetic layer which constitute the magnetic recording medium of the present invention, organic solvents are generally used. Examples of an organic solvent usable therein include ketones, such as acetone, methyl ethyl ketone, methyl isobutyl ketone, diisobutyl ketone, cyclohexanone, isophorone and tetrahydrofuran; alcohol compounds, such as methanol, ethanol, propanol, butanol, isobutyl alcohol, isopropyl alcohol and methylcyclohexanol; esters, such as methyl acetate, butyl acetate, isobutyl acetate, isopropyl acetate, ethyl lactate and glycol acetate; glycol ethers, such as glycol dimethyl ether, glycol monoethyl ether and dioxane; aromatic hydrocarbons, such as benzene, toluene, xylene, cresol and chlorobenzene; chlorinated hydrocarbons, such as methylene chloride, ethylene chloride, carbon tetrachloride, chloroform, ethylene chlorohydrin and dichlorobenzene; N,N-dimethylformamide; and hexane. These solvents can be used in combination, and that in arbitrary proportions. And these organic solvents are not always required to be 100% pure, but may contain impurities, such as isomers, unreacted materials, by-products, decomposed matter, oxides and moisture. The allowable level of contamination with such impurities is 30% or less, preferably 10% or less. The solvents used in the constituent layers maybe different in kind and amount, if desired. For instance, a highly volatile solvent is used in the non-magnetic layer to improve the surface properties, or a solvent having high surface tension (such as cyclohexanone or dioxane) is used in the non-magnetic layer to raise the coating consistency, or a solvent having a great solubility parameter is used in the magnetic layer to increase a degree of filling. Of course, uses for solvents should not be construed as being limited to those cases.

Additionally, the filling degree of a hexagonal (system) ferrite magnetic powder in the magnetic layer can be calculated from as and maximum magnetic flux density (Bm) of the hexagonal (system) ferrite magnetic powder used, and the value thereof is expressed as $Bm/4\pi\sigma s$. In the present invention, the suitable value for the filling degree is from 1.1 to 3.2 g/cm³, preferably from 1.2 to 3.0 g/cm³.

The magnetic recording medium of the present invention is produced by providing on a support a non-magnetic layer containing a non-magnetic powder and a binder resin, coating on the non-magnetic layer a magnetic coating composition prepared by kneading and dispersing a ferromagnetic powder and a binder resin as described above, if desired, together with other additives with an organic solvent, coating the coating composition, being subjected to orientation, and then drying the coating.

Each of processes of preparing a magnetic coating composition to form a magnetic layer and a non-magnetic coating composition to form a non-magnetic layer for the magnetic recording medium of the present invention includes a kneading step, dispersing step and, if required, mixing steps inserted before or after each of these steps. Each step may be parted into at least two stages. All the ingredients used in the present invention, including a magnetic powder, a non-magnetic powder, a binder resin, carbon black, an abrasive, an antistatic agent, a lubricant and a solvent, may be added at the start of or halfway through any of the steps. Further, each ingredient may be divided into at least two portions, and these portions may be added in separate steps. For instance, polyurethane may be divided into three portions, and these portions may be introduced in the kneading step, the dispersing step and the mixing step for viscosity adjustment after dispersion, respectively.

In kneading and dispersing the magnetic coating composition, various kneading machines can be used. Examples of a kneading machine usable herein include a two-rod roll mill, a three-rod roll mill, a ball mill, a pebble mill, a trommel, a sand grinder, Szegvari, an attrition mill, a high-speed impeller dispersing machine, a high-speed stone mill, a high-speed impact mill, a disper, a kneader, a high-speed mixer, a homogenizer and an ultrasonic dispersing machine.

In the kneading step, it is advantageous to use a mighty kneading machine, such as a continuous kneader or a pressurized kneader, from the viewpoint of ensuring high Br in the magnetic recording medium. In the case of using a continuous or pressurized kneader, a magnetic powder, a binder resin in all or a part of the required amount (preferably in at least 30 weight % of the total binder resin), and other ingredients required are placed in the kneader, and kneaded with an organic solvent added thereto in a proportion of 15 to 500 parts by weight to 100 parts by weight of the magnetic powder. The details of kneading treatment are described in Japanese Patent Application (Laid-Open) Nos. 106338/1989 and 79274/1989. In the present invention, the simultaneous multilayer coating method as disclosed in Japanese Patent Application (Laid-Open) No. 212933/1987 is adopted to achieve efficient production.

Formation of a plurality of coating layers on a support is effective in producing a magnetic recording medium of a high recording density, and the simultaneous coating method is an excellent method because a very thin magnetic layer can be formed thereby. Examples of a simultaneous coating method, namely a wet-on-wet coating method, are:

(1) a method in which a lower layer is coated first on a support by the use of a coating machine usually applied in coating magnetic coating compositions, such as a gravure, roll, blade or extrusion coater, and while the lower layer is still in a wet condition, an upper layer is coated thereon by the use of a pressurized support type extrusion coating machine as disclosed in Japanese Patent Publication No. 46186/1989 and Japanese Patent Application (Laid-Open) Nos. 238179/1985 and 265672/1990, (2) a method in which an upper layer and a lower layer are almost simultaneously coated by the use of a coating head with two slits for passage for passage of coating compositions as disclosed in Japanese Patent Application (Laid-Open) Nos. 88080/1988, 17971/1990 and 265672/1990, and (3) a method in which an upper layer and a lower layer are almost simultaneously coated by the use of a backup roll-attached extrusion coater as disclosed in Japanese Patent Application (Laid-Open) No. 174965/1990.

When the wet-on-wet method is adopted for coating, disturbance at the interface between the coated magnetic and non-magnetic layers and variations in the thickness of the coated magnetic layer can be minimized by approximating fluidity characteristics of a coating composition for the magnetic layer as closely as possible to those for the non-magnetic layer. The fluidity characteristics of a coating composition depend largely on what powder particles and binder resin are combined in the coating composition. Therefore, it is required to pay particular attention to selection of a non-magnetic powder used in the non-magnetic layer.

The appropriate content of a residual solvent in the magnetic layer is 100 mg/m² or below, preferably 10 mg/m² or below, and it is preferable that the residual solvent content in the magnetic layer is lower than that in the non-magnetic layer.

The suitable porosity of the non-magnetic layer and that of the magnetic layer are both 30 volume % or below, preferably 10 volume % or below. It is appropriate that the porosity of the non-magnetic layer be greater than that of the magnetic layer. However, the porosity of the non-magnetic layer may be smaller than that of the magnetic layer so far as it is not smaller than 5 volume %.

It is easily inferred that the non-magnetic layer and the magnetic layer may differ in those physical characteristics depending on the intended purpose. For instance, the running durability is enhanced by elevating a elasticity modulus of the magnetic layer, and at the same time the elasticity modulus of the non-magnetic layer is rendered lower than that of the magnetic layer to better a head touch on the magnetic recording medium.

The magnetic layer coated over the support in the above-described manner is subjected to orientation of the ferromagnetic powder incorporated therein, if needed, and then dried. Further, the magnetic layer is subjected to surface smoothening treatment, if desired. The material thus treated is cut into the desired shape, thereby producing the magnetic recording medium of the present invention.

The suitable elasticity modulus of the magnetic layer under 0.5% elongation is from 100 to 2,000 kg/mm² (980 to 19,600 MPa) in each of coating and width directions of the web, and the appropriate breaking strength is from 1 to 30 kg/cm² (98 to 2,940 PMa). The suitable elasticity modulus of the magnetic recording medium in each of coating and width directions of the web is from 100 to 1,500 kg/mm² (980 to 14,700 MPa), the appropriate residual elongation is not more than 0.5%, and the appropriate thermal shrinkage ratio at all temperatures of no higher than 100° C. is not more than 1%, preferably not more than 0.5%, particularly preferably not more than 0.1%.

The magnetic recording medium of the present invention may be a tape for video or backup of computer files, or a floppy or magnetic disk for data recording. In particular, the magnetic recording medium of the present invention is highly effective as a medium for digital recording to which a loss of signals caused by dropout is fatal. Moreover, when a double-layer structure constituted of a non-magnetic layer and a magnetic layer is given to the magnetic recording medium of the present invention and the thickness of the magnetic layer is reduced to 0.5 μm or below, the resulting recording medium can have high electromagnetic (conversion) characteristics and excellent overwrite characteristic and can achieve high-density and large-volume recording.

EXAMPLE

The features of the present invention will now be illustrated in more detail by reference to the following examples. However, the present invention should not be construed as being limited to these examples.

Formation of Hexagonal (System) Ferrite Magnetic Powder (1)

As starting materials for hexagonal (system) ferrite formation, various compounds were weighed out in the following amounts on an oxide basis.

| | |
|---|---|
| $B_2O_3$ | 4.7 mol |
| $BaCO_3$ | 10.0 mol |
| $Fe_2O_3$ | 11.3 mol |
| $CoCO_3$ | 0.56 mol |
| $ZnO$ | 0.50 mol |
| $Nb_2O_5$ | 0.12 mol |

These ingredients were mixed thoroughly with a powder mixer. The resulting mixture was put in a stirrer-attached Pt—Rh crucible, and molten for 2 hours at a temperature of 1300–1350° C. by means of a high-frequency induction furnace. Then, the molten matter in a determined amount was extruded between a pair of rotating stainless-made cooling rolls and quenched to yield amorphous flakes, and further pulverized.

The pulverized amorphous matter was placed in a ceramic vessel so as to be spread in a thickness of 2 cm, and fed into an electric furnace kept at 700° C. and made to stay therein for 2 hours. Immediately thereafter, the vessel was transferred to an electric furnace kept at 850° C. and made to stay therein for 3 hours. The thus processed matter was charged into a room-temperature metallic hopper, and thereby cooled. Thus, a crystalline powder was obtained. Further, the crystalline powder was ground with a planetary mill.

Formation of Hexagonal (System) Ferrite Magnetic Powders (2) and (3)

As starting materials for hexagonal (system) ferrite formation, various compounds were weighed out in the following amounts on an oxide basis.

| | |
|---|---|
| $B_2O_3$ | 4.7 mol |
| $BaCO_3$ | 10.0 mol |
| $Fe_2O_3$ | 10.8 mol |
| $CoCO_3$ | 0.54 mol |
| $ZnO$ | 0.50 mol |
| $Nb_2O_5$ | 0.12 mol |

Amorphous flakes were formed and pulverized under the same conditions as for the formation of hexagonal (system) ferrite magnetic powder (1), and then subjected to the following different treatments for formation of hexagonal (system) ferrite magnetic powders (2) and (3), respectively.

Formation of Hexagonal (System) Ferrite Magnetic Powder (2)

The pulverized amorphous matter was placed in a ceramic vessel so as to be spread in a thickness of 2 cm, and fed into an electric furnace kept at 700° C. and made to stay therein for 2 hours. Immediately thereafter, the vessel was transferred to an electric furnace kept at 850° C. and made to stay therein for 3 hours.

Formation of Hexagonal (System) Ferrite Magnetic Powder (3)

The pulverized amorphous flakes were placed in a ceramic vessel so as to be spread in a thickness of 2 cm, and fed into an electric furnace kept at 700° C. and made to stay therein for 2 hours. Immediately thereafter, the vessel was transferred to an electric furnace kept at 950° C. and made to stay therein for 3 hours.

Formation of Hexagonal (System) Ferrite Magnetic Powder (4)

| | |
|---|---|
| $BaCl_2 \cdot 2H_2O$ | 1.4 mol |
| $FeCl_2 \cdot 6H_2O$ | 13 mol |
| $CoCl_2 \cdot 6H_2O$ | 0.1 mol |
| $TiCl_4$ | 0.1 mol |

These ingredients were dissolved in 20 liter of purified water, mixed with a solution prepared by dissolving 5,000 g of NaOH and 1,250 g of $Na_2CO_3$ in 40 liter of purified water, and stirred to yield a coprecipitation product. The product was dried, ground and then mixed with NaCl as a flux. The resulting mixture was heated at 825° C. for 2 hours to be subjected to reaction, followed by cooling.

Production of Magnetic Powders Treated with Organic Matters

Examples 1 to 10 and Comparative Examples 1 to 3

Each of the magnetic powders (1) to (3) formed by the vitrification crystal method was immersed in a 2 mol/l aqueous acetic acid solution (pKa=4.56) in which an organic matter selected from the compounds shown in Table 1 was mixed in a concentration of 3 wt % (wherein the ratio of the magnetic powder to the aqueous acetic acid solution was adjusted to 1:20 by weight), kept at 80° C. for 5 hours to remove a glass component. Therefrom, microcrystals were recovered by filtration. The microcrystals recovered were washed with a large amount of ion-exchanged water, dehydrated, dried at 100° C., and further subjected to consolidation treatment with muller. Thus, the intended ferromagnetic powders were obtained individually.

By X-ray diffraction analyses, it was proved that these ferromagnetic powders had a magnetoplumbite structure. These ferromagnetic powders were each observed under a transmission electron microscope, and thereby their respective average particle sizes were determined. Further, each of the ferromagnetic powders was degassed for 30 minutes at 250° C. in the atmosphere of nitrogen, and examined for specific surface area by the BET method. The magnetic characteristics thereof were determined by the use of VSM (Vibrating Sample Magnetometer) under the applied magnetic field of 800 kA/m.

Production of Magnetic Powders Treated with Organic Matters

Examples 11 to 15

The magnetic powder (1) formed by the vitrification crystal method was immersed in a 2 mol/l aqueous acetic acid solution (pKa=4.56), and kept at 80° C. for 5 hours to remove a glass component. Therefrom, microcrystals were recovered by filtration. The microcrystals recovered were added to a solution containing in purified water 5 weight % of an organic matter selected from the compounds shown in Table 2 (wherein the ratio of the magnetic powder to the aqueous solution was adjusted to 1:20 by weight), mixed with stirring, and filtered. The microcrystals recovered were washed with a large amount of ion-exchanged water, dehydrated, dried at 100° C., and further subjected to consolidation treatment with muller. Thus, the intended ferromagnetic powders were obtained individually.

By X-ray diffraction analyses, it was proved that these ferromagnetic powders had a magnetoplumbite structure. These ferromagnetic powders were each observed under a transmission electron microscope, and thereby their respective average particle sizes were determined. Further, each of the ferromagnetic powders was degassed for 30 minutes at 250° C. in the atmosphere of nitrogen, and examined for specific surface area by the BET method. The magnetic characteristics thereof were determined by the use of VSM (Vibrating Sample Magnetometer) under the applied magnetic field of 800 kA/m.

Production of Magnetic Powders Treated with Organic Matters

Examples 16 to 17 and Comparative Example 4

The magnetic powder (4) formed by the coprecipitation flux method was added to a solution containing in purified water 5 weight % of an organic matter selected from the compounds shown in Table 2 (wherein the ratio of the magnetic powder to the aqueous solution was adjusted to 1:20 by weight), mixed with stirring, and filtered. The microcrystals recovered were washed with a large amount of ion-exchanged water, dehydrated, dried at 100° C., and further subjected to consolidation treatment with muller. Thus, the intended ferromagnetic powders were obtained individually.

By X-ray diffraction analyses, it was proved that these ferromagnetic powders had a magnetoplumbite structure. These ferromagnetic powders were each observed under a transmission electron microscope, and thereby their respective average particle sizes were determined. Further, each of the ferromagnetic powders was degassed for 30 minutes at 250° C. in the atmosphere of nitrogen, and examined for specific surface area by the BET method. The magnetic characteristics thereof were determined by the use of VSM under the applied magnetic field of 800 kA/m.

TABLE 1

| | Magnetic powder | Organic matter | | Average tabular diameter (nm) | Variation coefficient of average tabular diameter | Average tabular thickness (nm) | Specific surface area ($m^2$/g) | Coercive force (Hc) (kA/m) | $\sigma s$[*] $(A \cdot m^2/kg)$ |
|---|---|---|---|---|---|---|---|---|---|
| | | Compound name or chemical formula | pKa value | | | | | | |
| Example 1 | (1) | ethylenediamine-tetramethylene-phosphonic acid | 1.8 | 22.5 | 26.1 | 6.6 | 86.4 | 171.3 | 48.8 |

TABLE 1-continued

| | Magnetic powder | Organic matter | | Average tabular diameter (nm) | Variation coefficient of average tabular diameter | Average tabular thickness (nm) | Specific surface area ($m^2/g$) | Coercive force (Hc) (kA/m) | σs*⁾ ($A \cdot m^2/kg$) |
|---|---|---|---|---|---|---|---|---|---|
| | | Compound name or chemical formula | pKa value | | | | | | |
| Example 2 | (1) | diethylenetriamine-pentamethylene-phosphonic acid | 1.8 | 22.5 | 26.1 | 6.6 | 87.5 | 172.5 | 48.5 |
| Example 3 | (1) | heptasodium diethylenetriamine-pentamethylene phosphonate | 1.8 | 22.5 | 26.1 | 6.6 | 84.6 | 171.1 | 49.1 |
| Example 4 | (1) | $C_6H_5PO(OH)_2$ | 1.8 | 22.5 | 26.1 | 6.6 | 90.3 | 175.2 | 48.2 |
| Example 5 | (1) | $C_6H_5OPO(OH)_2$ | 2.0 | 22.5 | 26.1 | 6.6 | 80.5 | 173.8 | 48.6 |
| Example 6 | (1) | $C_6H_5SO_3H$ | 2.6 | 22.5 | 26.1 | 6.6 | 85.2 | 174.9 | 48.3 |
| Example 7 | (2) | ethylenediamine-tetramethylene phosphonic acid | 1.8 | 26.8 | 27.8 | 7.2 | 76.6 | 143.3 | 50.8 |
| Example 8 | (2) | $C_6H_5PO(OH)_2$ | 1.8 | 26.8 | 27.8 | 7.2 | 79.1 | 144.5 | 50.6 |
| Example 9 | (3) | ethylenediamine-tetramethylene phosphonic acid | 1.8 | 30.2 | 28.3 | 9.5 | 58.7 | 149.2 | 53.1 |
| Example 10 | (3) | $C_6H_5PO(OH)_2$ | 1.8 | 30.2 | 28.3 | 9.5 | 60.5 | 150.3 | 52.7 |
| Comparative Example 1 | (1) | nothing | — | 22.5 | 26.1 | 6.6 | 67.3 | 165.5 | 50.2 |
| Comparative Example 2 | (2) | nothing | — | 26.8 | 27.8 | 7.2 | 59.7 | 135.2 | 52.5 |
| Comparative Example 3 | (3) | nothing | — | 30.2 | 28.3 | 9.5 | 48.2 | 140.6 | 54.7 |

*⁾Saturation magnetization as a magnetic characteristic.

TABLE 2

| | Magnetic powder | Organic matter | | Average tabular diameter (nm) | Variation coefficient of average tabular diameter | Average tabular thickness (nm) | Specific surface area ($m^2/g$) | Coercive force (Hc) (kA/m) | σs*⁾ ($A \cdot m^2/kg$) |
|---|---|---|---|---|---|---|---|---|---|
| | | Compound name or chemical formula | pKa value | | | | | | |
| Example 11 | (1) | ethylenediamine-tetramethylene phosphonic acid | 1.8 | 22.5 | 26.1 | 6.6 | 84.5 | 169.8 | 49.8 |
| Example 12 | (1) | diethylenetriamine-pentamethylene phosphonic acid | 1.8 | 22.5 | 26.1 | 6.6 | 85.1 | 170.2 | 48.7 |
| Example 13 | (1) | $C_6H_5PO(OH)_2$ | 1.8 | 22.5 | 26.1 | 6.6 | 88.6 | 173.3 | 48.8 |
| Example 14 | (1) | $C_6H_5OPO(OH)_2$ | 2.0 | 22.5 | 26.1 | 6.6 | 80.7 | 171.5 | 49.5 |
| Example 15 | (1) | $C_6H_5SO_3H$ | 2.6 | 22.5 | 26.1 | 6.6 | 83.8 | 172.8 | 49.1 |
| Example 16 | (4) | ethylenediamine-tetramethylene phosphonic acid | 1.8 | 39.5 | 33.2 | 10.5 | 51.6 | 295.1 | 53.5 |
| Example 8 | (4) | $C_6H_5PO(OH)_2$ | 1.8 | 39.5 | 33.2 | 10.5 | 52.2 | 298.4 | 52.1 |
| Comparative Example 4 | (4) | nothing | — | 39.5 | 33.2 | 10.5 | 40.7 | 280.5 | 56.1 |

*⁾Saturation magnetization as a magnetic characteristic.

As is apparent from the results of Tables 1 and 2, the hexagonal (system) ferrite magnetic powders produced by the method of the present invention, whether the hexagonal (system) ferrite was treated with an organic matter-acetic acid mixed solution (as in Examples 1 to 10) or sequentially treated with an aqueous acetic acid solution and an organic matter solution (as in Examples 11 to 15) or treated with an organic matter solution and not treated with an aqueous acetic acid solution (as in Examples 16 and 17), namely the organic matter-treated hexagonal (system) ferrite magnetic powders, had large specific surface areas, as compared with the hexagonal (system) ferrite magnetic powders which had the equal measure of average tabular diameter but was treated with an aqueous acetic acid solution alone. (Specifically, comparisons are drawn between each of Examples 1 to 6 and 11 to 15 and Comparative Example 1, between each of Examples 7 and 8 and Comparative Example 2, between each of Examples 9 and 10 and Comparative Example 3, and between each of Examples 16 and 17 and Comparative Example 4). Large values of specific surface area mean that the stacking of particles is loosen, and therefore the hexagonal (system) ferrite produced by the method of the present invention can have excellent dispersibility.

Preparation of Coating Compositions

In the following description, all parts are by weight unless otherwise indicated.

| Formula of Magnetic Coating Composition (1): | |
|---|---|
| Barium ferrite | 100 parts |
| Binder resin | |
| Vinyl chloride copolymer (containing 1 × 10$^{-4}$ eq/g of —SO$_3$K groups and having a polymerization degree of 300) | 14 parts |
| Polyester polyurethane resin (neopentyl glycol/caprolactone polyol/MDI = 0.9/2.6/1, —SO$_3$Na content: 1 × 10$^{-4}$ eq/g) | 5 parts |
| α-Alumina (average grain size: 0.15 μm) | 2 parts |
| Carbon black (average grain size: 30 nm) | 5 parts |
| Butyl stearate | 2 parts |
| Stearic acid | 3 parts |
| Methyl ethyl ketone | 125 parts |
| Cyclohexanone | 125 parts |
| Formula of Magnetic Coating Composition (2): | |
| Barium ferrite | 100 parts |
| Binder resin | |
| Vinyl chloride copolymer (containing 1 × 10$^{-4}$ eq/g of —SO$_3$K groups and having a polymerization degree of 300) | 15 parts |
| Polyester polyurethane resin (neopentyl glycol/caprolactone polyol/MDI = 0.9/2.6/1, —SO$_3$Na content: 1 × 10$^{-4}$ eq/g) | 6 parts |
| α-Alumina (average grain size: 0.15 μm) | 3 parts |
| Carbon black (average grain size: 30 nm) | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone | 125 parts |
| Cyclohexanone | 125 parts |

| Formula of Magnetic Coating Composition (1): | |
|---|---|
| Acicular hematite (specific surface area by BET method: 55 m$^2$/g, average major axis length: 0.10 μm, average acicular ratio: 7, pH: 8.8, aluminum hydroxide treatment: 1 weight % as Al$_2$O$_3$) | 80 parts |
| Carbon black (average grain size: 17 nm, DBP-oil absorption: 80 ml/100 g, Specific surface area by BET method: 240 m$^2$/g, pH: 7.5) | 20 parts |
| Binder resin | |
| Vinyl chloride copolymer (containing 1 × 10$^{-4}$ eq/g of —SO$_3$K groups and having a polymerization degree of 300) | 14 parts |
| Polyester polyurethane resin (neopentyl glycol/caprolactone polyol/MDI = 0.9/2.6/1, —SO$_3$Na content: 1 × 10$^{-4}$ eq/g) | 5 parts |
| Phenylphosphonic acid | 3 parts |
| Butyl stearate | 3 parts |
| Stearic acid | 3 parts |
| 1:1 Mixture of methyl ethyl ketone and cyclohexanone | 280 parts |
| Formula of Magnetic Coating Composition (1): | |
| Acicular hematite (specific surface area by BET method: 55 m$^2$/g, average major axis length: 0.10 μm, average acicular ratio: 7, pH: 8.8, aluminum hydroxide treatment: 1 weight % as Al$_2$O$_3$) | 80 parts |
| Carbon black (average grain size: 17 nm, DBP-oil absorption: 80 ml/100 g, Specific surface area by BET method: 240 m$^2$/g, pH: 7.5) | 20 parts |
| Binder resin | |
| Vinyl chloride copolymer (containing 1 × 10$^{-4}$ eq/g of —SO$_3$K groups and having a polymerization degree of 300) | 15 parts |
| Polyester polyurethane resin (neopentyl glycol/caprolactone polyol/MDI = 0.9/2.6/1, —SO$_3$Na content: 1 × 10$^{-4}$ eq/g) | 5 parts |
| Phenylphosphonic acid | 3 parts |
| Butyl stearate | 10 parts |
| Butoxyethyl stearate | 5 parts |
| Isohexadecyl stearate | 2 parts |
| Stearic acid | 3 parts |
| 1:1 Mixture of methyl ethyl ketone and cyclohexanone | 280 parts |

For preparing each of the magnetic coating compositions (1) and (2) and the non-magnetic coating compositions (1) and (2), the pigment, the vinyl chloride copolymer and each of the solvents in 50 weight % of the prescribed amount were kneaded by means of a kneader. Thereto, the polyester polyurethane resin and the remaining ingredients were added, and the admixture was dispersed with a sand grinder. To the dispersion obtained, isocyanate was added in an amount of 15 parts in the cases of the non-magnetic coating compositions or 14 parts in the cases of the magnetic coating compositions. Each of the admixtures was further mixed with 30 parts of cyclohexanone, and filtered through a filter having an average pore size of 1 μm. Thus, the coating compositions for forming non-magnetic layers and those for forming magnetic layers were prepared individually.

Production of Tapes

Examples 21 to 26, Comparative Example 21, Examples 31 and 32, Comparative Example 31, Examples 41 and 42, and Comparative Example 41

The non-magnetic coating composition (1) for a non-magnetic layer was coated on a 7 μm-thick polyethylene terephthalate support so as to have a dry thickness of 1.5 μm. Immediately thereafter, the magnetic coating composition (1) was coated on the non-magnetic coating composition which was still in a wet state by use of a simultaneous wet multiple-layer coating technique. In each Example, coverage of the magnetic coating composition was controlled to form a layer having the intended thickness. Both layers thus coated on the support were passed through an orientation device while they were still in a wet state, and thereby orientation in the length direction (i.e., the machine direction) was achieved. More specifically, the orientation was performed by passing the coated material between rare earth magnets (surface magnetic flux: 500 mT), further passing through a solenoid magnet (magnetic flux density: 500 mT), then drying insides the solenoid to an extent to cause no return of the orientation, and further drying the magnetic layer, followed by reeling. The thus processed material underwent calendering treatment using a 7-stage calender made metallic rolls under a roll temperature of 90° C. The web-shaped magnetic recording medium thus obtained was slit into 8 mm-wide tapes to prepare 8 mm video-tape samples.

The video-tape samples were each examined for coercive force (Hc), squareness ratio (SQ), switching field distribution (SFD), magnetic layer thickness (δ), residual magnetic flux density×magnetic layer thickness (Br·δ), surface roughness, output and C/N ratio. The evaluation results of those factors are shown in Tables 3 to 5.

oriented material was passed successively through two alternate magnetic field generators different in magnetic field strength, specifically a device generating a magnetic field having strength of 24 kA/m at a frequency of 50 Hz and a device generating a magnetic field having strength of 12 kA/m at a frequency of 50 Hz, and thereby random orientation was achieved. The percentage of orientation degree achieved therein was at least 98%.

The other surface of the support was subjected to the same coating, orientation and drying processes as described above. Further, the double-sided magnetic material thus

TABLE 3

|  | Magnetic powder used | Coercive force (Hc) (kA/m) | Squareness ratio (SQ) | SFD | Magnetic layer thickness (δ) (μm) | Br · δ (mT · μm) | Surface roughness (nm) | Output (dB) | C/N ratio (dB) |
| --- | --- | --- | --- | --- | --- | --- | --- | --- | --- |
| Example 21 | Example 1 | 181.7 | 0.674 | 0.455 | 0.16 | 16.2 | 2.5 | 1.5 | 6.5 |
| Example 22 | Example 2 | 181.2 | 0.665 | 0.458 | 0.15 | 15.1 | 2.4 | 1.4 | 6.2 |
| Example 23 | Example 4 | 186.5 | 0.688 | 0.412 | 0.15 | 15.6 | 2.3 | 1.8 | 6.9 |
| Example 24 | Example 5 | 183.7 | 0.672 | 0.444 | 0.16 | 16.6 | 2.4 | 1.6 | 6.5 |
| Example 25 | Example 11 | 180.1 | 0.696 | 0.458 | 0.14 | 14.1 | 2.9 | 1.2 | 5.2 |
| Example 26 | Example 13 | 183.3 | 0.675 | 0.429 | 0.14 | 14.2 | 2.5 | 1.4 | 5.8 |
| Comparative Example 21 | Comparative Example 1 | 173.5 | 0.601 | 0.565 | 0.15 | 13.5 | 3.4 | 0.0 | 0.0 |

TABLE 4

|  | Magnetic powder used | Coercive force (Hc) (kA/m) | Squareness ratio (SQ) | SFD | Magnetic layer thickness (δ) (μm) | Br · δ (mT · μm) | Surface roughness (nm) | Output (dB) | C/N ratio (dB) |
| --- | --- | --- | --- | --- | --- | --- | --- | --- | --- |
| Example 31 | Example 7 | 153.8 | 0.671 | 0.522 | 0.16 | 17.2 | 2.6 | 0.9 | 4.8 |
| Example 32 | Example 8 | 154.9 | 0.675 | 0.513 | 0.15 | 16.2 | 2.5 | 1.1 | 5.2 |
| Comparative Example 31 | Comparative Example 2 | 142.6 | 0.611 | 0.587 | 0.15 | 14.7 | 3.6 | 0.0 | 0.0 |

TABLE 5

|  | Magnetic powder used | Coercive force (Hc) (kA/m) | Squareness ratio (SQ) | SFD | Magnetic layer thickness (δ) (μm) | Br · δ (mT · μm) | Surface roughness (nm) | Output (dB) | C/N ratio (dB) |
| --- | --- | --- | --- | --- | --- | --- | --- | --- | --- |
| Example 41 | Example 9 | 160.3 | 0.689 | 0.513 | 0.16 | 17.6 | 2.7 | 1.2 | 5.2 |
| Example 42 | Example 10 | 162.1 | 0.694 | 0.508 | 0.15 | 16.7 | 2.5 | 1.5 | 5.5 |
| Comparative Example 41 | Comparative Example 3 | 150.7 | 0.622 | 0.577 | 0.15 | 14.9 | 3.7 | 0.0 | 0.0 |

Production of Flexible Disks

Examples 51 and 52, and Comparative Example 51

The non-magnetic coating composition (2) for a non-magnetic layer was coated on a 68 μm-thick polyethylene terephthalate support so as to have a dry thickness of 1.5 μm. Immediately thereafter, the magnetic coating composition (2) for a magnetic layer was coated on the non-magnetic coating composition which was still in a wet state by the use of a simultaneous wet multiple-layer coating technique. Therein, coverage of the magnetic coating composition was controlled so as to form a magnetic layer of the desired thickness. Both layers thus coated were passed between same polarity-opposed rare earth magnets having a center magnetic field strength of 398 kA/m while they were still in a wet state, thereby achieving orientation in the length direction (i.e., the machine direction). Thereafter, the thus formed was subjected to treatment using a 7-stage calender at a temperature of 90° C. under a linear pressure of 300 kg/cm.

Each of the thus surface-treated magnetic materials was stamped into disks measuring 3.7 inches in diameter, and then underwent thermal treatment (70° C. for 24 hours) to promote curing of the coating layers and further burnish treatment with polishing tape to cut away projections on the surfaces. Thereafter, each of these disks was encased in a 3.7-inch cartridge in which a liner was previously installed (Zip-disk cartridge, produced by U.S. IOMEGA Inc.) and further to the cartridge were attached the desired mechanical parts. Thus, 3.5-inch floppy disks were produced.

The floppy disk samples were each examined for coercive force (Hc), squareness ratio (SQ), SFD, magnetic layer thickness (δ), residual magnetic flux density×magnetic layer thickness (Br·δ), surface roughness, output and error rate.

The evaluation results of those factors are shown in Table 6.

TABLE 6

|  | Magnetic powder used | Coercive force (Hc) (kA/m) | Square-ness ratio (SQ) | SFD | Magnetic layer thickness (δ) (μm) | Br · δ (mT · μm) | Surface roughness (nm) | Output (dB) | Error rate ($10^{-6}$) |
|---|---|---|---|---|---|---|---|---|---|
| Example 51 | Example 16 | 296.5 | 0.576 | 0.705 | 0.20 | 17.9 | 2.9 | 0.4 | 0.001 |
| Example 52 | Example 17 | 300.4 | 0.568 | 0.702 | 0.20 | 17.6 | 2.8 | 0.5 | 0.003 |
| Comparative Example 51 | Comparative Example 4 | 280.8 | 0.554 | 0.706 | 0.20 | 17.2 | 3.7 | 0.0 | 6.9 |

<Evaluation Methods>

Characteristics of each magnetic recording medium were evaluated in the following manners.

Coercive Force (Hc)

The coercive force (Hc) of each sample was measured in a direction parallel to the direction of orientation in an externally applied magnetic field of 800 kA/m by means of a vibrating sample magnetometer (made by Toei Kogyo K. K.).

Magnetic Layer Thickness (δ)

From a magnetic recording medium sample, sections having a thickness of about 0.1 μm were cut across the length direction by means of a diamond cutter. Each section was observed under a transmission electron microscope at a magnification of 50,000 times, and photographs thereof were taken. The print size of these photographs were A-4 (210×297 mm) or A-5 (148×210 mm) size, and the overall magnification was adjusted to 200,000 times in print size. On the photo prints each, the interface between the magnetic layer and the lower layer, which was visually judged from a shape difference between the ferromagnetic powder and the non-magnetic powder, and the magnetic layer surface were each bordered with a black line. And the spacing between these black lines was measured with an image processing device IBAS2 made by Zeiss A. G. When the sample photograph had a length of 21 cm, the measuring process was repeated 85 to 300 times. The mean value of the data obtained therein was taken as the magnetic layer thickness (δ).

Surface Roughness

The surface of each sample was surveyed over an area of 250 μm square by the use of a light-interference three-dimensional roughness meter TOPO-3D (made by WYKO Co. in US Arizona State). In evaluation of measurement values, corrections including slope correction, spherical correction and cylindrical correction were made in accordance with JIS-B601, and the center-plane average roughness (Ra) was adopted as the surface roughness.

C/N Ratio and Output of Tape

An 8-mm deck for data recording was equipped with an MIG head (having a head gap of 0.2 μm, a track width of 17 μm, a saturation flux density of 1.5 T and an azimuth angle of 20 degrees) and an MR head for playback (having SAL bias, an MR element made from Fe—Ni, a track width of 6 μm , a gap length of 0.2 μm and an azimuth angle of 20 degrees). By the use of the MIG head, the relative velocity between a tape and the head was set at 10.2 m/sec, an optimum recording current was determined from the input-output characteristic of ½Tb (λ=0.5 μm), and signals were recorded with this current. The thus recorded signals were played back with the MR head, and output thereof was measured. C/N was defined so as to cover from the reproducing carrier peak to demagnetization noise, and the resolution band width of an spectral analyzer was adjusted to 100 kHz. The C/N ratio and output values shown in Tables 3 to 5 are relative values, with the tape prepared in Comparative Example concerning each magnetic powder, wherein traditional washing was carried out, being taken as 0 dB.

Output of Flexible Disk

Output was measured at a line packing density of 144 kbpi and at a track density of 144 tpi. As the output reference, commercial zip-100 was employed. The line packing density is a bit number of signals recorded per inch in the recording direction. And the track density is a number of tracks per inch. The product of line packing density and track density is an area packing density. The output values shown in Table 6 are relative values, with the disk prepared in Comparative Example being taken as 0 dB wherein traditional washing was carried out.

Error Rate

Signals of the line packing density determined by the measurement of output were recorded on a sample disk in accordance with (2,7) RLL modulation system, and errors were measured.

As is apparent from the results of Tables 3 to 6, the magnetic recording media according to the present invention produced high output. This is reflection from small surface roughness and great squareness ratio values of the magnetic recording media of the present invention, as compared with those of the comparative magnetic recording media. When attention focuses on noise, it has been found that the magnetic recording media of the present invention were markedly reduced in noise, as compared with the comparative magnetic recording media; as a result, high C/N was achieved.

Effect of the Invention

The hexagonal (system) ferrite produced by the method of the present invention is prevented form stacking, and so it has excellent dispersibility and high suitability for magnetic recording media. And application of the hexagonal (system) ferrite of the present invention to a magnetic layer enables the resulting magnetic recording medium to have good surface properties, high short-wavelength output and excellent C/N even in reproduction with an MR head, and low medium noise.

The entitle disclosure of each and every foreign patent application from which the benefit of foreign priority has been claimed in the present application is incorporated herein by reference, as if fully shown herein.

While the invention has been described in detail and with reference to specific embodiments thereof, it will be apparent to one skilled in the art that various changes and modifications can be made therein without departing from the spirit and scope thereof.

What is claimed is:

1. A method of producing hexagonal (system) ferrite, wherein the hexagonal (system) ferrite having an average tabular diameter of 10 to 40 nm and a coercive force (Hc) of 135 to 400 kA/m is treated with an organic compound having at least one polar group selected from the group consisting of PO(OH)$_2$, OPO(OH)$_2$, SO$_3$H and SO$_2$H and/or a salt thereof when the hexagonal (system) ferrite is recovered and washed.

2. A magnetic recording medium comprising on a support a non-magnetic layer comprising a non-magnetic powder dispersed in a binder resin and on the non-magnetic layer a magnetic layer comprising a ferromagnetic powder dispersed in a binder resin, wherein the ferromagnetic powder comprises a hexagonal (system) ferrite magnetic powder that has an average tabular diameter of 10 to 40 nm and a coercive force (Hc) of 135 to 400 kA/m and is subjected to treatment with an organic compound containing a polar group having-an acid dissociation constant (pKa) of 4 or below and/or a salt thereof.

3. The method of producing hexagonal (system) ferrite as in claim 1, wherein said hexagonal (system) ferrite has an average thickness of from 2 to 15 nm, an variation coefficient of the average tabular diameter of from 0 to 35% and an average tabular ratio of from 1.5 to 4.

4. The magnetic recording medium as in claim 2, wherein said hexagonal (system) ferrite has an average thickness of from 2 to 15 nm, an variation coefficient of the average tabular diameter of from 0 to 35% and an average tabular ratio of from 1.5 to 4.

5. The magnetic recording medium as in claim 2, wherein the organic compound have at least one polar group selected from the group consisting of PO(OH)$_2$, OPO(OH)$_2$, SO$_3$H and SO$_2$H.

6. The method of producing hexagonal (system) ferrite as in claim 1, wherein the polar group has an acid dissociation constant (pKa) of 3.8 or below.

7. The magnetic recording medium met as in claim 2, wherein the polar group has an acid dissociation constant (pKa) of 3.8 or below.

* * * * *